United States Patent [19]

Rynbrandt et al.

[11] Patent Number: 5,219,483
[45] Date of Patent: Jun. 15, 1993

[54] METHOD TO INCREASE THE RATE OF ICE MELTING BY CMA DEICING CHEMICALS WITH POTASSIUM ACETATE

[75] Inventors: Jay D. Rynbrandt, San Rafael; Karl A. Hoenke, Martinez, both of Calif.

[73] Assignee: General Atomics International Services Corporation, San Diego, Calif.

[21] Appl. No.: 679,647

[22] Filed: Apr. 2, 1991

[51] Int. Cl.⁵ .................................................. C09K 3/18
[52] U.S. Cl. .......................................... 252/70; 106/13; 562/607
[58] Field of Search ............................ 252/70; 106/13; 562/607

[56] References Cited

U.S. PATENT DOCUMENTS

| | | | |
|---|---|---|---|
| 4,374,743 | 2/1983 | Stockel | 252/70 |
| 4,377,488 | 3/1983 | Gancy | 252/70 |
| 4,400,285 | 8/1983 | Gancy | 252/70 |
| 4,426,308 | 1/1984 | Gancy | 252/70 |
| 4,444,672 | 4/1984 | Gancy | 252/70 |
| 4,855,071 | 8/1989 | Todd, Jr. et al. | 252/70 |
| 4,913,831 | 4/1990 | Todd, Jr. et al. | 252/70 |

FOREIGN PATENT DOCUMENTS

88/05457 7/1988 World Int. Prop. O. .

Primary Examiner—Christine Skane
Attorney, Agent, or Firm—Heller, Ehrman, White & McAuliffe

[57] ABSTRACT

Improved deicing compositions are provided which comprise calcium magnesium and potassium acetate containing up to about 50% potassium acetate which have improved melting properties as compared to calcium magnesium acetate deicing compositions.

14 Claims, No Drawings

METHOD TO INCREASE THE RATE OF ICE MELTING BY CMA DEICING CHEMICALS WITH POTASSIUM ACETATE

BACKGROUND OF THE INVENTION

Calcium magnesium acetate (CMA) is useful for deicing and several methods for making CMA-containing deicing compositions are known. In the context of this invention, the term CMA will mean calcium magnesium acetate-containing compositions, including pure compositions or mixtures containing crystalline and/or amorphous, hydrated and/or dehydrated calcium magnesium acetate, and/or calcium magnesium acetate double salt. Crystalline and/or amorphous magnesium acetate and/or calcium acetate may also be present. The CMA may also contain small amounts of calcium and/or magnesium hydroxides or oxides as impurities. The term CMAK includes the materials defined as components of CMA, and in addition, potassium acetate.

Commonly assigned U.S. Pat. No. 4,885,071 discloses a process utilizing a pumpable slurry which forms substantial quantities of a 1:2 calcium:magnesium ratio CMA double salt. As used herein the ratio describing a CMA or CMAK product will be the molar ratio of calcium to magnesium in the product. The slurry process disclosed therein includes preparation of both alkali and alkaline earth metal acetates.

Several related patents to Gancy, U.S. Pat. Nos. 4,426,308, 4,377,488 and 4,444,672, disclose the use of 2-5% of alkali metal hydroxides in addition to calcium magnesium acetate (CMA). In these patents, it is generally taught to add excess acid to the alkali earth bases and thereafter to add 2-5% (weight) of alkali metal hydroxide (potassium hydroxide is disclosed) at the end of the neutralization step to neutralize excess acid. In U.S. Pat. No. 4,400,285 there is disclosed the combination of calcium oxide with potassium acetate in which potassium acetate is described as a soluble agent which is also a deicer.

In none of the above-described patents is it disclosed that there is a synergy between potassium acetate with CMA to improve the performance of calcium magnesium acetate as a deicing agent.

We have now discovered, surprisingly, that a solid mixture of CMA and potassium acetate (CMAK) either in crystalline form or as an amorphous combination of salts, has unexpectedly superior deicing properties compared to those of calcium magnesium acetate (amorphous, crystalline and/or double salt), calcium acetate or magnesium acetate. The superior properties of CMAK include, but are not limited to, improved deicing characteristics sustained constantly over the useful subfreezing temperature range of about 15° F. to about freezing (32° F.). There is also a persistent improvement in deicing properties of CMAK without drop off at any given subfreezing temperature, for at least one hour after application to ice.

It is thus an object of the present invention to provide an improved deicing composition comprising acetates of calcium, magnesium and potassium (CMAK) in which the potassium acetate is present in an amount relative to the calcium acetate and magnesium acetate to provide improved ice melting properties, as compared to the same weight of calcium magnesium acetate, which improvement remains relatively constant over the useful subfreezing temperature range of about 15° to about freezing (32° F.), and which improvement in deicing performance is persistent without drop off at a given subfreezing temperature for at least about one hour after application to ice.

SUMMARY OF THE INVENTION

The present invention is directed to improved deicing compositions and methods for making same, which compositions comprise calcium acetate, magnesium acetate and potassium acetate, wherein the amount of potassium acetate comprises up to about 50% by weight of the combined weight of the acetates. A range of about 7% to 15% is preferred. The most preferred composition comprises 7% (wt.) potassium acetate. The acetates may be in amorphous or crystalline single salt or amorphous or crystalline combined salt forms, as previously described.

Among the properties of the deicing CMAK compositions according to the present invention is an improvement as compared to calcium magnesium acetate deicers, throughout the useful subfreezing temperature range of about 15° to about freezing (32° F.), and a persistence of this improvement at a given subfreezing temperature in that range for at least about one hour after its application to ice.

Particularly preferred compositions are those having a stoichiometry in which the calcium:magnesium ratio is in the range of 5:4 to 1:9, and particularly preferred compositions are those which the calcium:magnesium ratio is 3:7 and 1:2. The amount of the potassium acetate in the CMAK composition will be in the range of greater than zero to about 50% by weight, with those containing about 7% to 15% by weight being preferred. The stoichiometric amount of acetate will be that required to ionically balance the cumulative positive charges of the calcium, magnesium and potassium ions.

DESCRIPTION OF THE PREFERRED EMBODIMENTS

The deicing compositions of the present invention comprise calcium acetate, magnesium acetate and potassium acetate, with the potassium acetate comprising greater than 0 up to about 50% by weight of the combined weight of the acetates The compositions may be substantially anhydrous, however, a small amount of water is preferred as long as the composition remains dry to the touch. This means that there is preferably some, but less than about 10% (wt.), and most preferably less than about 5% by weight of water in the composition. However, even if a greater amount of water is present, i.e. up to about 15%, the CMAK will be useful as long as the composition is essentially solid.

The following are the preferred methods for forming the CMAK compositions according to the present invention.

In one method, the requisite stoichiometric amount of potassium to result in the desired weight percent of potassium acetate in the final product, in the form of potassium hydroxide, is preferably added to excess liquid (glacial or concentrated acetic acid) acetic acid, then mixed. Then the calcium and magnesium oxides or hydroxides (which may be provided in the form of dolomitic lime, which contains magnesium oxides) are added to provide the requisite amounts of calcium and magnesium while simultaneously neutralizing the acid. Additional acetic acid can be added, particularly since it is preferred to keep the mixture at or below a pH of about 5.5, until late in the neutralization process, at which point the pH may be allowed to rise to about 6.5. The resulting solid is preferably dried to less than about 10% by weight water, to form the solid CMAK.

Alternatively, solutions of potassium hydroxide may be added at once or in portions in any order to the magnesium base or calcium base, followed by the other (magnesium or calcium) base, and more potassium hydroxide solution as long as the pH is maintained below about 6.5.

In another method, two steps are involved whereby acetic acid is added to a water slurry of the dolomitic lime, or calcium and potassium oxides and/or hydroxides, followed by the addition of magnesium oxides or hydroxides with stirring. A variation of this method may be used whereby acetic acid is added to a water slurry of magnesium and potassium oxides and/or hydroxides, followed by addition of calcium oxides and/or hydroxides. These two-step methods are useful in a dryer/granulator such as that disclosed in the commonly assigned U.S. Pat. Nos. 4,913,831 and 4,855,071, since rapid thickening may be avoided in such an apparatus, thereby allowing better mixing of the ingredients.

In another method, a water slurry containing the calcium, magnesium and potassium in the form of dolomitic lime, or their oxides and/or hydroxides is made and then the slurry is mixed with acetic acid.

In the above described procedures, the resulting composition is preferably dried at a convenient drying temperature, preferably in the range of about 145°–165° F., to obtain a solid having a moisture content of about 1–15% by weight.

In any of the above procedures, it is desirable to obtain a pH in the mixture that is below about 7.5, and preferably below 5.5, until the bulk of the acid has been added. To minimize undesirable acetic acid vapors during drying, the pH of the mixture is preferably maintained in the range of about 6–7, usually around 6.5, at or near the end of acetic acid reaction with the bases.

The method of adding a slurry of calcium, magnesium and potassium oxides and/or hydroxides simultaneously to acetic acid is another preferred method when used in conjunction with the dryer/granulator disclosed in the aforementioned commonly assigned patents.

Particularly preferred compositions comprise 1:2 CMA and/or 3:7 CMA and potassium acetate. These 1:2 and 3:7 CMA compositions as well as methods for making same are disclosed in commonly assigned U.S. Pat. Nos. 4,913,831 and 4,855,071, which are incorporated by reference herein. The CMA made by those methods also include CMA double salts.

The amount of potassium acetate (KA) in the CMAK mixture may be from greater than zero up to about 50% (wt.). The upper limit is due to the practical need to maintain CMAK as a handleable solid. At higher KA concentration, the CMAK becomes a soft, viscous mass too quickly when exposed to the atmosphere, and thus is not readily handled for spreading onto icy surfaces, such as streets and airport runways.

The advantageous ice-melting characteristics disclosed herein of CMAK versus CMA appear to be directly related to the amount of KA in the CMAK. It is preferred, however, to use compositions of CMAK containing about 7% to 15% by weight of KA, with 7% being most preferred.

In a particularly preferred embodiment, the solid CMAK may be subjected to pressure by flattening in a press. Pressures of less than 4000 psi are preferred in order to preserve some porous structure which is believed to be beneficial to ice-melting properties in the CMAK. Most of the performance benefit is attributable to the presence of KA. The pressed cake of CMAK may then be broken into smaller pieces. By pressure treatment, formation of CMAK dust is reduced and the handling properties are improved, relative to non-pressure treated CMAK.

Particularly when made in the dryer/granulator (disclosed above in commonly assigned patents), the CMAK deicing compositions prepared according to the above processes are usually isodimensional and may be controlled to an average size as large or small as desired. For example, deicing compositions may be made having a size range as small as 48 Tyler mesh (about 0.295 mm diameter) to about 0.371 inches (about 9.5 mm diameter). Preferred sizes are in the range of $-5$ to $+28$ mesh size, due in part to their ease of use with conventional machinery for distribution of deicing compositions.

The CMAK may be dried and made into pellets by distributing a CMAK slurry in a thin layer on substrate particles then drying the substrate particles. The substrate may be an inert support, for example a traction aid, fertilizer (urea), ammonium phosphate, phosphate rock, etc. or other aggregate. Various materials may be used as a substrate upon which a CMAK slurry is distributed. Preferred substrates include traction aids and preformed CMAK particles.

Other traction aids include, but are not limited to, sand, crushed limestone, pulverized corn cob, nut shells, expanded shale, vermiculite, pumice, cinders, and other substantially insoluble minerals with good antislip properties.

Accordingly, the above processes provide particulate CMAK deicing compositions that penetrate through ice rapidly, have a uniformity in size, are substantially isodimensional shape and have a pellet hardness such that maximum deicing effectiveness is obtained with a minimum of dust during handling of the particles.

The term pH, when used in connection with a slurry (a solution of a soluble substance above the saturation point for the soluble substance, whether or not the solution contains non-soluble suspended material), refers to the pH when the slurry is measured by diluting one part of slurry to 10 parts of water. The CMAK compositions according to the present invention will preferably have a pH in the range of about 6.5–9.0 when slurried in water.

While not limiting the invention to any particular theory, in order to elucidate the present understanding of the invention for those of ordinary skill in the art to be further enabled to practice and understand the invention, the following is presented as the present understanding of accounting for the unexpected deicing properties of the compositions of the present invention. It may be desirable to add the potassium hydroxide early (i.e., before most of the hydroxides or oxides react with the acid) to the mixture of acid and magnesium and/or calcium hydroxides or oxides. This would probably ensure rapid reaction with acid and avoid reaction of the KOH with the already formed magnesium acetate. Potassium hydroxide, if added to a neutral calcium magnesium mixture, will react with some of the magnesium acetate to provide gelatinous and sticky magnesium hydroxides which are deleterious to ice melting properties and also lead to corrosion.

In one particular method for forming compositions of the present invention, particulate calcium magnesium acetate (already prepared) may be mixed with potassium acetate.

The following examples are provided by way of illustration to enhance the understanding of the invention but are not intended to limit the invention in any way.

EXAMPLE A

Ice Melting Test Procedure

Four hundred grams of distilled water was added to a stainless steel (10"×15"×2") pan. The pan was covered with standard aluminum foil and sealed on both ends. The pans were placed in a cold room set at a temperature of 25° F. After the ice had set at 25° F. for at least 18 hours, 10.8 g of deicing chemical was evenly sprinkled over the ice in each pan in the cold room. This sprinkling took about 1 minute 10.8 g/133 sq. in. of ice surface is equivalent to 25.8 lb/1000 ft$^2$. (Note: The pan lip, sloped sides and rounded corners reduce its surface area.) The aluminum foil was replaced and the pans were then left at 25° C. for a total of 60 mins.

The melt liquid from each pan was poured for 30 sec. at 25° F. into a tared bottle and the melt was weighed. The thaw in one hour was recorded. It indicates the effectiveness of the deicing chemical for ice melting.

EXAMPLE 1

Addition of Potassium Acetate to CMA

Calcium magnesium acetate with potassium (CMAK) was prepared by adding potassium acetate to a batch of 3/7 (calcium/magnesium) CMA.

The CMA was prepared by adding a mixture of 273 g of hydrated dolomitic lime and 112 g of magnesium oxide (98% pure) to 816 g of glacial acetate acid premixed with 600 g of distilled water. The reaction was carried out in an open stirred reactor, fitted with a gear-pump-driven recirculating loop to break up lumps which collect on the sides of the reactor during addition to solids. The solids were added over about 2 hours. The final pH of the liquid slurry was 6.7 and its temperature was 62° C.

Potassium acetate was added with stirring to a liquid of the slurry in the proportions shown in Table I.

TABLE I

| Ex. | CMA slurry (gms) | K Acetate (gms) | Wt Percent KOAc |
| --- | --- | --- | --- |
| 1A | 161 | 10.7 | 12% |
| 1B | 125 | 30.7 | 30% |
| 1C | 89 | 50.1 | 50% |

A reference slurry (no KOAc) and the potassium-acetate containing slurries were dried in a microwave oven to about 5 wt percent water. They were then broken up and sieved to mesh size (US) 8–12 for testing ice melting performance (per Example A). This microwave drying procedure resulted in less dense product than that produced in a spherodizer.

Table II shows the ice-melting benefit of having potassium acetate in the above-described CMA mixtures. As can be seen, 12% potassium acetate improves ice-melting performance by almost 40%.

TABLE II

| | Ice-melting Performance of CMAK | | |
| --- | --- | --- | --- |
| Ex. | Wt % KOAc in CMA | Thaw in 1 Hour (gms) 25° F. | % Improved |
| Control | 0 | 23.6 | — |
| 1A | 12 | 32.9 | 39 |
| 1B | 30 | 38.6 | 64 |
| 1C | 50 | 40.4 | 71 |

EXAMPLE 2

CMAK - 7.2

CMAK-7.2 was prepared in a batch process in a pilot plant. Sufficient potassium hydroxide was added so that the product contained 7.2% by weight potassium acetate (assuming a simple mixture rather than a new compound). The potassium hydroxide, lime and magnesium oxides were added to water to form a slurry and then acetic acid was added to pH 5.5. The water content of the neutralized slurry was about 60%. This slurry was then dried in a spherodizer in the same manner as is described in the process patent, U.S. Pat. No. 4,855,071.

This CMAK had 60% faster ice-melting than similarly prepared CMA, as evidenced by a one hour ice-melting test at 25° F.

EXAMPLE 3

Field Test

Field tests were performed on an airport runway. The CMAK applied at 300 lbs/lane-mile performed at about the same level as a commercial CMA (alone) at 450 lbs/lane-mile for maintenance of road surface friction.

Referring to Table III, there is shown the ratio of melt weights at different temperatures (see the test in Example A) of CMAK-containing compositions versus the ratio of the melt weight of a calcium magnesium acetate standard (containing amorphous CMA with a Ca:Mg ratio of 3:7). The sample melt weight ratio:-standard melt weight ratio is the performance ratio.

By definition the calcium magnesium acetate standard preparation has a performance ratio about 1, whereas quite unexpectedly, the CMAK has a performance ratio of well above 1.

Table III shows the performance ratio of CMAK over the temperature ranges of 15° to 28° F. The CMA standard sample, within the temperature range of 20°–28° F., has a defined performance ratio of 1 whereas the CMAK has a relative performance ratio, over that same temperature range, in the range of 1.59 to 1.64.

In the performance ratios of the samples at 25° C. for 60 minutes following application (Table III), not only does CMAK have an increasing performance ratio (1.39 to 1.62), but it was higher than CMA (defined as 1) during the entire 60 minute period.

TABLE III

| Performance Ratios of CMAK Ice-Melts to CMA Reference | | | | |
| --- | --- | --- | --- | --- |
| | Temperature °F. | | | |
| Time | 15 | 20 | 25 | 28 |
| 60 min | 1.66 | 1.59 | 1.62 | 1.64 |
| 30 min | | | 1.43 | |
| 15 min | | | 1.39 | |

What is claimed is:

1. A deicing composition comprising calcium acetate, magnesium acetate and potassium acetate, said potassium acetate comprising from about 7% to about 50% by weight of the combined dry basis weight of said composition, wherein the Ca:Mg ratio in said acetates is in the range of about 5:4 to 1:9.

2. A deicing composition according to claim 1 wherein said acetates are in the form of amorphous or crystalline single salts or combined salts.

3. A deicing composition according to claim 2 wherein at least a portion of said acetates are in a crystalline form.

4. A deicing composition according to claim 3 wherein said acetates comprise a double salt with a Ca:Mg ratio of 3:7.

5. A deicing composition according to claim 3 wherein said acetates comprise a double salt with a Ca:Mg ratio of 1:2.

6. A deicing composition according to claim 1 wherein said potassium acetate comprises about 7% to 15% by weight of said combined weight.

7. A composition according to claim 1 characterized by a pH in the range of 6.5 to 9.0 when slurried in water.

8. A deicing composition comprising particles of compressed calcium acetate, magnesium acetate and potassium acetate, said potassium acetate comprising from about 7% to about 50% by dry weight bases of the combined weight of said composition, wherein the Ca:Mg ratio in said acetates is in the range of about 5:4 to 1:9.

9. A deicing composition according to claim 8 wherein said acetates are in the form of amorphous or crystalline single salts or combined salts.

10. A deicing composition according to claim 9 wherein at least a portion of said acetates are in a crystalline form.

11. A deicing composition according to claim 10 wherein said acetates comprise a double salt with a Ca:Mg ratio of 3:7.

12. A deicing composition according to claim 10 wherein said acetates comprise a double salt with a Ca:Mg ratio of 1:2.

13. A deicing composition according to claim 8 wherein said potassium acetate comprises less than about 10% by dry weight basis of said combined weight.

14. A composition according to claim 8 characterized by a pH in the range of 6.5 to 9.0 when slurried in water.

* * * * *